R. McWILLLIAMS.

Car-Axle Box.

No. 841. Reissued Oct. 25, 1859,

Witnesses:

Jacob S. Fisk

W. G. Connor

Inventor:

S. W. Hoffman

Adam J. Frearick

UNITED STATES PATENT OFFICE.

SAMUEL W. HOFFMAN AND ADAM J. FREDERICK, OF PHILADELPHIA, PA., ASSINGEES, BY MESNE ASSIGNMENTS, OF ROBERT McWILLIAMS.

IMPROVEMENT IN JOURNAL-BOXES FOR RAILROAD-CARS.

Specification forming part of Letters Patent No. 24,846, dated July 19, 1859; Reissue No. 841, dated October 25, 1859.

*To all whom it may concern:*

Be it known that we, SAMUEL W. HOFFMAN and ADAM J. FREDERICK, both of the city of Philadelphia, and State of Pennsylvania, have become the owners of Letters Patent for certain Improvements in Journal-Boxes granted to the said HOFFMAN, as assignee of ROBERT McWILLIAMS, on the 19th day of July, 1859, which patent is deemed inoperative and invalid by reason of a defective specification; and we do hereby declare the following to be a full, clear, and exact description of the invention of the said McWILLIAMS, reference being had to the accompanying drawings, and to the letters of reference marked thereon.

The invention relates to certain improvements in journal-boxes for which Letters Patent were granted to the said McWILLIAMS and ADAM J. FREDERICK on the 15th day of December, 1857; and the improvement consists, first, in a peculiar construction and arrangement of the upper and lower half of the box, whereby the latter can be adjusted to the former without disturbing the saturated packing contained in the oil-chamber, and whereby the upper edge of the rear end of the oil-chamber may be made to fit closely to the under side of the axle and to retain the main body of the oil within the chamber, thus obviating the defects which detract from the efficiency of the aforesaid invention; second, in a self-adjusting packing peculiarly arranged within the upper half of the box in respect to the lower half, so that the latter may retain the leather packing in its proper position, and so that the packing may be removed and replaced from the front of the box, thereby avoiding the inconvenient and tedious plans of packing at the back.

In order to enable others to make and use the said invention, we will now proceed to describe its construction and operation.

Figure 1:
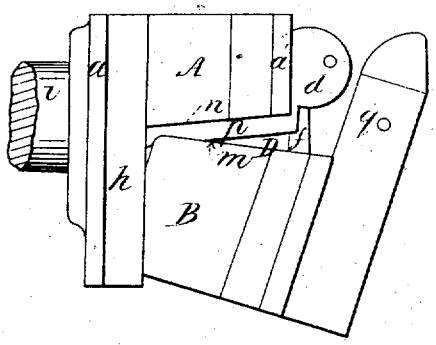
Figure 2:
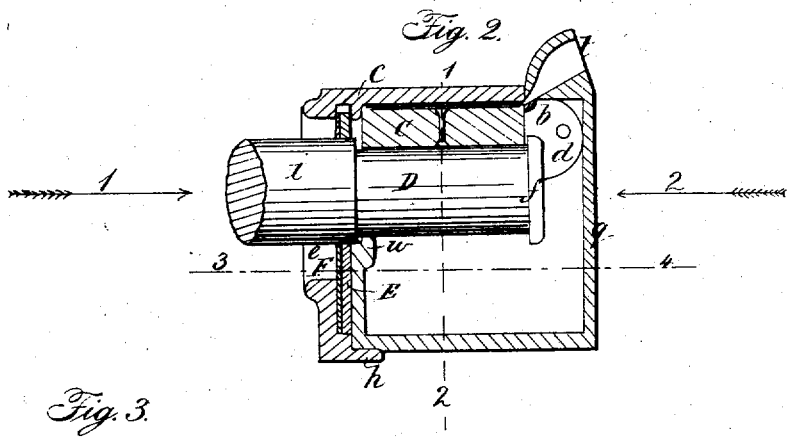
Figure 3:
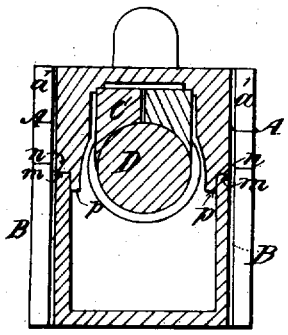
Figure 4:
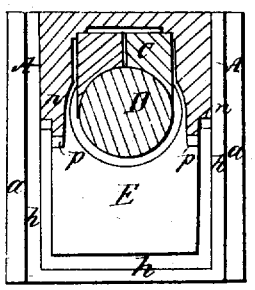
Figure 5:
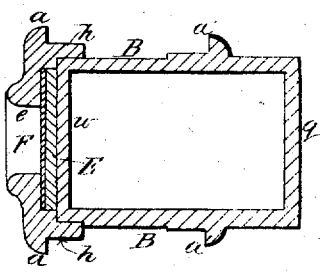

On reference to the accompanying drawings, which form a part of this specification, Figure 1 is a side view of the improved axle-box, illustrating the method of connecting and disconnecting the lower half of the same; Fig. 2, a sectional elevation of the box; Fig. 3, a transverse section of the line 1 2, Fig. 2, looking in the direction of the arrow 1; Fig. 4, a transverse section on the same line, but looking in the direction of the arrow 2, the lower half of the box being removed in this view; Fig. 5, a sectional plan on the line 3 4, Fig. 2.

Similar letters refer to similar parts throughout the several views.

A is the upper half, and B the lower detachable half, of the axle-box. The upper half, A, has on each side the usual lugs, *a a*, which serve to guide the box during its vertical movement in a hanger of the ordinary construction. C is the brass bearing, fitting snugly in a recess in the upper half, A, of the box and maintained in its proper position in front by a lip, *b*, and at the back by a lip, *c*. In front of the upper half, A, of the box, and forming part of the same, are two projections, *d d*, the object of which will be rendered apparent hereinafter. In the rear of the box is an opening, *e*, for the admission of the axle D, the said opening being elongated vertically, in order that the box may be raised to a sufficient height to allow the brass bearing C to be removed and replaced by passing it between the collar *f* on the end of the axle and the retaining-lip *b*.

It will be observed on reference to Fig. 4 that the vertical portion of the upper half, A, of the box has a flange, *h*, extending down each side and transversely across the bottom, thus forming a recess or socket for the reception of the end of the oil box, which forms a part of the lower half, B, of the box. Within the recess formed by the flange *h* is another recess for the reception of the leather strip E and the metal plate F, this recess extending upward to within a short distance from the top of the box, as seen in Fig. 2.

The enlarged portion *i* of the axle D passes through and fits snugly, but so as to move freely, in circular openings both in the leather strip and iron plate.

It will be seen on reference to Fig. 2 that the recess for the reception of the leather strip is somewhat longer than the strip itself, thus enabling the latter to rise with the shaft as the brass bearing wears.

The lower half, B, of the box, the greater portion of which forms the oil-chamber, fits snugly with its end into the socket formed by the flange *h* of the upper half of the box.

The upper edges, *m*, of the oil-chamber fit to the inclined shoulders, *n*, on the upper half of the box, a flange, *p*, projecting from each shoulder a short distance into the inside of the oil-chamber.

The vertically-projecting portion *q* of the lower half of the box is a continuation of the oil-chamber, and fits snugly over the projections *d* of the upper half of the box, a simple bolt passed through this portion *q* and through the projections *d* being all that is necessary to secure the two halves of the box together.

Oil is furnished to the journal through an orifice in a projection, *t*, communicating with a passage in the upper half of the box, through which the oil flows into a channel cut into the top of the brass bearing, and thence through an opening in the latter to the journal of the axle.

It will be observed that the point of junction of the edge *m* of the lower half with the edge *n* of the upper half of the box is in a line above the lower line of the journal. In this respect the present improvement is similar to that invented by R. McWilliams, and described in the patent granted to the said McWilliams and Adam J. Frederick on the 15th day of December, 1857. In the axle-box described in that patent, however, permanent grooves were formed on each side of the upper half of the box above the line of junction with the lower half, longitudinal projections being formed on the latter to fit into the grooves, so that on adjusting the lower half to the upper half of the box it was necessary to maintain the former in nearly a horizontal position while it was being slided onto the upper half.

There are two serious objections to this mode of securing the two halves together. First, it is necessary that the end of the oil-chamber should be hollowed out sufficiently to escape the outer collar of the journal on sliding the lower half of the box to its place, so that when adjusted the hollow upper edge of the end of the oil-box is so far below the journal that the main body of oil contained in the box is always accessible to the leather packing, and consequently readily finds its way between the latter and the axle, the result being, of course, a great waste of oil.

The second and no less serious objection is that in sliding the lower half of the box horizontally, or nearly so, so as to fit to the upper half of the box, the outer collar of the axle bears against the cotton packing contained in the oil-chamber and forces it to the front of the latter, so that the rear part of the journal is free from contact with the said packing, and is therefore insufficiently lubricated.

The present improvement has been especially designed to obviate the above objectionable features.

By the peculiar construction of the upper and lower half of the box the latter in being adjusted to the former is depressed in front, as seen in Fig. 1, the end of the oil-chamber resting on the bottom flange, *h*, of the socket of the upper half of the box. The outer end of the lower half of the box is then gradually raised, and at the same time pressed forward, until the edge *n* of the upper half coincides with the edge *m* of the lower half and the projections *d* fit into the vertical portion *q* of the lower half of the box. By this arrangement the end *w* of the oil-chamber may be hollowed out to an extent just sufficient to fit snugly both to the under side of the journal and enlarged portion of the axle near the shoulder of the latter, thus excluding the main body of the oil from contact with the leather packing, and at the same time allowing the axle to have the usual lateral play, as seen in Fig. 2.

It will also be seen that by this method of adjusting the lower to the upper half of the box the saturated packing remains undisturbed and distributes the oil evenly throughout the entire surface of the journal.

The lower portion of the leather strip E, which is in one piece, and that of the plate F are retained in their proper position against the end of the box by the end of the oil-chamber, as best observed on reference to Fig. 2.

As sufficient room is left for the leather strip to rise in its recess as the brass bearing becomes worn, it is evident that it will adjust itself to the position of the axle and continue to act as a means of preventing the escape of oil, no matter what may be the extent of the wear of the bearing.

It should be understood that the only object of the plate F is to prevent the leather strip from bulging outward into the elongated opening *e*.

We wish it to be understood that we do not claim, broadly, making the box in two halves and so arranging the same that the point of junction shall be above the lower line of the bearing, as this arrangement is covered by the patent granted to the said McWilliams and A. J. Frederick on the 15th day of December, 1857; nor do we claim, broadly, a leather packing at the rear of the box for excluding the oil, or a metallic plate for retaining the packing in its proper position; but

We claim as the invention of the said McWilliams, and as an improvement on the axle-box described in the aforesaid patent—

1. The upper half, A, of the box with its socket formed by the flanges *h*, in combination with the lower half, B, of the box, when the two halves are arranged substantially as set forth, so that on adjusting the lower half to its place it may assume the position shown in Fig. 1, and so that when adjusted the end *w* of the oil-chamber shall be close to the axle, as and for the purpose specified.

2. The self-adjusting leather packing E and the metal plate F, when both are dependent upon the lower half of the box for their proper position within the other half, and when they are otherwise arranged in respect to both upper and lower half of the box, as and for the purpose set forth.

In testimony whereof we have signed our names to this specification in the presence of two subscribing witnesses.

S. W. HOFFMAN.
ADAM J. FREDERICK.

Witnesses:
JACOB S. FISH,
W. G. CONROW.